United States Patent
Malis et al.

(10) Patent No.: US 12,453,895 B2
(45) Date of Patent: Oct. 28, 2025

(54) SYSTEM FOR AUTOMATICALLY LOGGING STRENGTH EXERCISE DATA

(71) Applicants: Vadim Malis, San Diego, CA (US); Oliver Kurt Karl-Heinz Ernst, San Diego, CA (US)

(72) Inventors: Vadim Malis, San Diego, CA (US); Oliver Kurt Karl-Heinz Ernst, San Diego, CA (US)

( * ) Notice: Subject to any disclaimer, the term of this patent is extended or adjusted under 35 U.S.C. 154(b) by 209 days.

(21) Appl. No.: 17/724,257

(22) Filed: Apr. 19, 2022

(65) Prior Publication Data

US 2022/0339499 A1 Oct. 27, 2022

Related U.S. Application Data

(60) Provisional application No. 63/176,773, filed on Apr. 19, 2021.

(51) Int. Cl.
*A63B 24/00* (2006.01)
*A63B 21/00* (2006.01)

(52) U.S. Cl.
CPC .......... *A63B 24/0062* (2013.01); *A63B 21/40* (2015.10); *A63B 24/0006* (2013.01); *A63B 2024/0012* (2013.01); *A63B 2024/0071* (2013.01)

(58) Field of Classification Search
CPC . A63B 24/0062; A63B 21/40; A63B 24/0006; A63B 2024/0012; A63B 2024/0071; A63B 21/0628; A63B 21/0724; A63B 21/0726; A63B 2220/40; A63B 2220/833; A63B 2225/50; G16H 40/63; G16H 20/30
See application file for complete search history.

(56) References Cited

U.S. PATENT DOCUMENTS

| | | | | |
|---|---|---|---|---|
| 9,656,120 | B1* | 5/2017 | Franco | A63B 24/0062 |
| 10,376,739 | B2* | 8/2019 | Cook | G16H 20/30 |
| 11,135,477 | B1* | 10/2021 | Kneknas | G01B 21/24 |
| 2013/0288859 | A1* | 10/2013 | Watterson | A63B 24/0062 482/8 |
| 2017/0216665 | A1* | 8/2017 | Mahr | A63B 71/0619 |
| 2018/0117417 | A1* | 5/2018 | Davis | A63B 24/0075 |
| 2020/0009442 | A1* | 1/2020 | Kasabdji Raffensperger | A63B 71/0622 |
| 2020/0070001 | A1* | 3/2020 | Malis | A63B 24/0062 |
| 2021/0008413 | A1* | 1/2021 | Asikainen | G06F 3/0304 |

(Continued)

FOREIGN PATENT DOCUMENTS

WO   WO-2016138042 A2 *   9/2016  ......... A63B 24/0062

*Primary Examiner* — Andrew M Kobylarz
(74) *Attorney, Agent, or Firm* — Volpe Koenig

(57) ABSTRACT

A method and system for measuring exercise data using a plurality of wireless sensors is disclosed. The plurality of wireless sensors are attached onto or into a plurality of pieces of strength training equipment, wherein each individual wireless sensor from the plurality of wireless sensors is attached to and associated with an individual piece of strength training equipment of the plurality of pieces of strength training equipment. An individual piece of strength training equipment of the plurality of pieces of strength training equipment is selected and the wireless sensor is registered with selected piece of strength training equipment with a computing device. Strength training equipment details may be identified through the computing device.

11 Claims, 13 Drawing Sheets

(56) References Cited

U.S. PATENT DOCUMENTS

2022/0212060 A1\* 7/2022 Davis ................ A63B 24/0087
2024/0108946 A1\* 4/2024 Semegen ........... A63B 71/0619

\* cited by examiner

SYSTEM FOR AUTOMATICALLY LOGGING STRENGTH EXERCISE DATA

CROSS REFERENCE TO RELATED APPLICATION

This application claims the benefit of U.S. Provisional Application No. 63/176,773, filed on Apr. 19, 2021, which is incorporated herein by reference as if fully set forth.

FIELD OF INVENTION

The present invention relates to measuring, displaying, and storing exercise data from dumbbells, bar with weight plates, weight plate loaded machines, or selectorized fitness machines.

BACKGROUND

The ability to track workout statistics is an increasingly important part of exercising. This includes the weights lifted, the repetition count, and other physical statistics such as the force exerted over time, power exerted over time, energy consumed, as well as other metadata such as workout equipment used, the muscle groups exercised, the exercise duration, and the geographic or physical location of the exercise.

In many commercial and home gyms, devices that record data about exercise are dominantly limited to cardiovascular machines, such as treadmills or stationary bikes. It would be desirable to track data for existing weight machines or free weights.

One difficulty in designing such devices is that the device must be able to measure data from different equipment with diverse ranges of motion for free weights and configurations of weights in the case of weight machines. Many of the existing devices are limited to very specific machine configurations.

Another difficulty is to design a system for identifying users, displaying exercise data in real-time and storing data for later retrieval by users that is easily accessible to users, but robust across gyms and machine types. This difficulty is also shared by fitness tracking devices currently installed in gyms, where data is rarely stored permanently in the cloud for users to retrieve and analyze later.

It would be advantageous to have a system that addresses these challenges for both free weights and selectorized fitness machines such as will now be described by the present teachings in greater detail.

SUMMARY

A method and system for measuring exercise data using a plurality of wireless sensors is disclosed. The plurality of wireless sensors are attached onto or into a plurality of pieces of strength training equipment, wherein each individual wireless sensor from the plurality of wireless sensors is attached to and associated with an individual piece of strength training equipment of the plurality of pieces of strength training equipment. An individual piece of strength training equipment of the plurality of pieces of strength training equipment is selected and the wireless sensor is registered with selected piece of strength training equipment with a computing device. Strength training equipment details may be identified through the computing device. A user may perform a type of strength training exercise using the selected individual piece of strength training equipment of the plurality of pieces of strength training equipment. The associated individual wireless sensor of the plurality of wireless sensors collects exercise data and the exercise data is wireless transmitted. The type of strength training exercise may be recognized based on the exercise data. The exercise data and type of exercise may be displayed to a user via a display physically connected or wirelessly connected to the computing device.

BRIEF DESCRIPTION OF THE DRAWINGS

These, and other, features, aspects and advantages of the embodiments of the present invention described below will become more fully apparent from the following detailed description, appended claims, and accompanying drawings, in which the same reference numerals are used for designating the same elements throughout the several figures, and in which:

DETAILED DESCRIPTION OF THE PREFERRED EMBODIMENTS

To fully describe the invention, a detailed description will now follow with reference to the drawings FIG. 1 through FIG. 13. These drawings represent an example of what the invention may entail. The present invention may be embodied in other forms but featuring the same essential characteristics. The scope of the invention is precisely defined by the appended claims.

Figure 1:
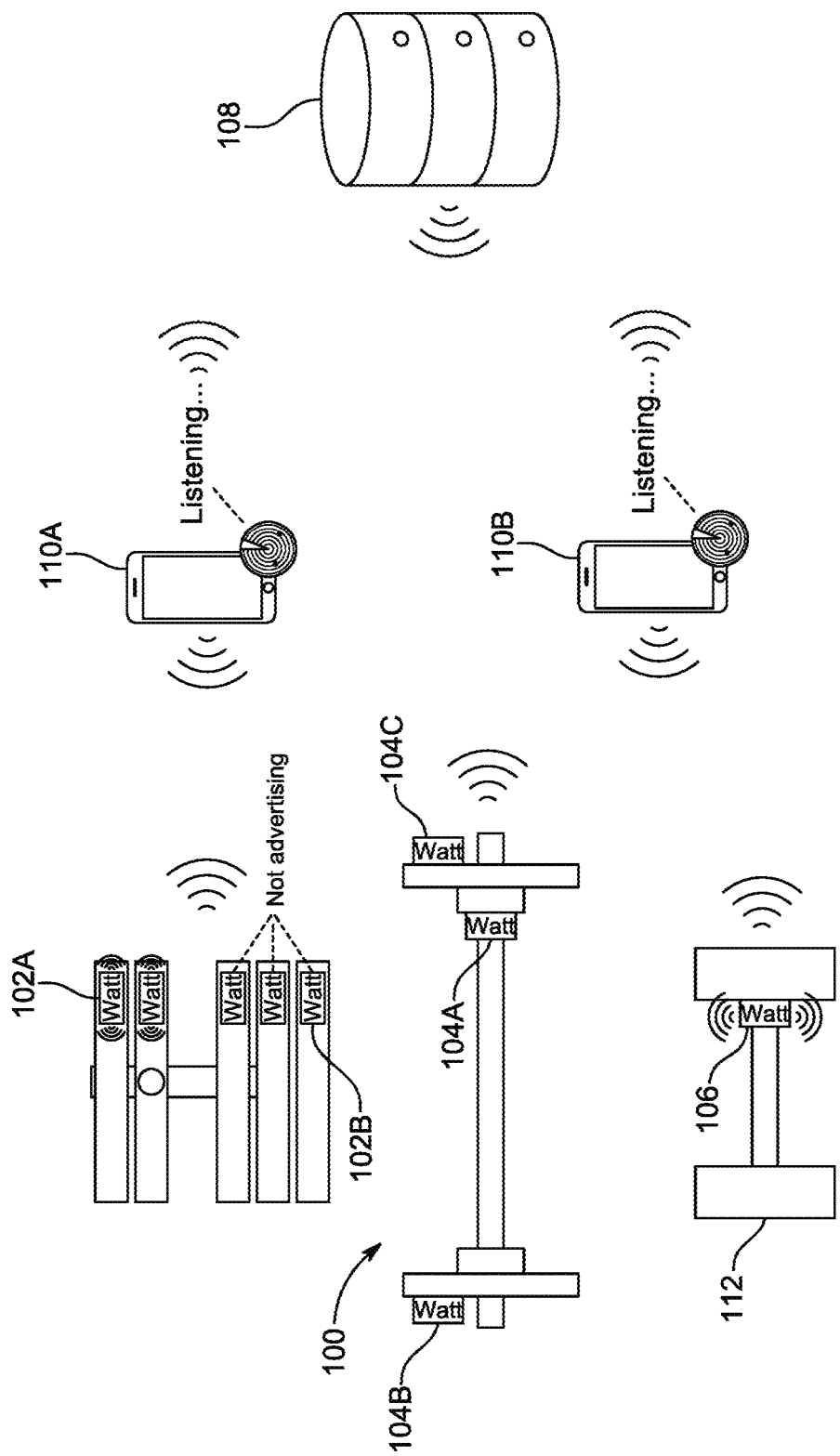
FIG. 1 is an example embodiment of the system overview applied to multiple types of exercise equipment and multiple devices.
Figure 2:
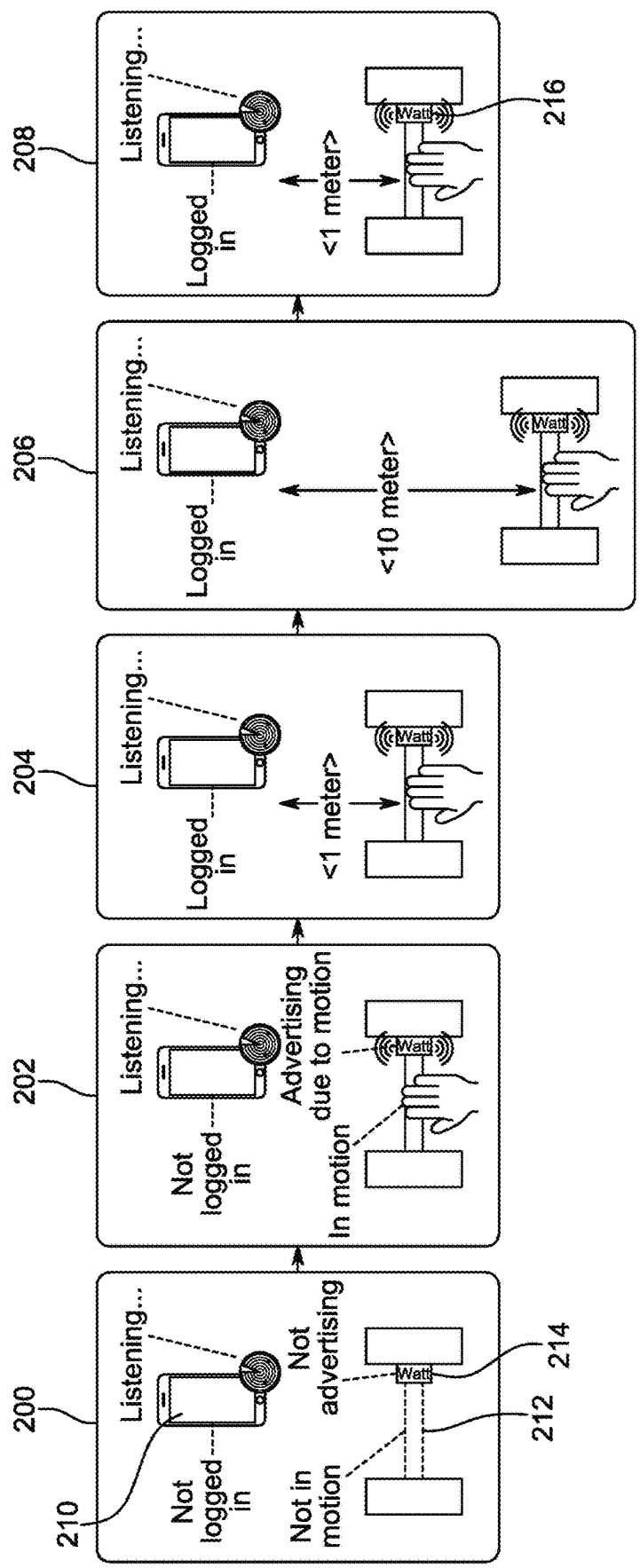
FIG. 2 is an example embodiment of the setup process applied to a dumbbell or barbell.

FIG. 1 shows an example pictorial embodiment of the system 100 comprising a unified, single hardware configuration, software-configurable sensors 102A 102B 104A 104B 104C 106, a database 108, a computing device such as a phone or other wearable such as a smart watch 110A 110B, and motion analysis functions performed by the computing device. Every piece of weight equipment in the system may be attached to a unified type of sensor either embedded internally or attached externally. For example the weight equipment may include but is not limited to dumbbells 112, barbells, Olympic bars, plates for use with barbells, and plate-loaded fitness machines. Further the sensors may also be either embedded internally or attached externally to the frame or grip of plate loaded fitness machines, the individual weights on selectorized machines, and the grips or frame of selectorized machines. In an example, the sensors 102A 102B 104A 104B 104C 106 may be beacons containing Bluetooth emitters and accelerometers. To use the system, users may choose the equipment they would like use, log the equipment in to the computing device, and exercise, as shown in FIG. 2.

The database 108 may store information about every sensor in the system, including sensor configuration type and what each unified type of sensor is attached to. The database 108 may be used to upload analyzed exercise information for each user of the system from the computing device after data processing. When installed the sensors (beacons) broadcast the battery information and when the user is exercising (is reading machine ID or accelerometer data) the phone reads battery information in the background which is then updated on the server. This may allow a user, or gym operator, to keep track of the battery information for all the beacons, and notify gym staff or the service team to replace battery when necessary.

The database 108 may also store information about equipment that is in use. When a user's phone reads data from the equipment it writes to the database a time-stamp of this event. Other users cannot use this equipment for exercising unless the time-stamp is expired. When the user loges out from the equipment (finishes exercising) the time-stamp in the database is updated to an expired state allowing other users to use the equipment.

The computing device 110A 110B may be a phone or wearable electronic device such as a smart watch, and may be able to read and write to the database, identify sensors, and process the information broadcasted by the sensors with developed algorithms. In one embodiment applied to a dumbbell or barbell 112, the unified type of sensor 106 comprises a three-axis accelerometer, a wireless data input and output module with embedded ID, and a replaceable battery. The wireless sensor 106 could be attached (e.g. embedded internally or attached externally) to the dumbbell 112. The unified type of sensor may be placed on existing equipment without the need to permanently alter any existing equipment.

FIG. 2 is an example embodiment of the setup log-in sensing process applied to a dumbbell or barbell. For the log-in sensing capability, each unified type of sensor may be configured to broadcast a unique ID when motion triggered. In the embodiment displayed in FIG. 2, at rest 200 the dumbbell 212 is on an equipment rack. The user device 210 is not logged in and the unified type of sensor 214 is not broadcasting. When the dumbbell 212 is picked up, the unified type of sensor begins broadcasting 202. When a motion-triggered unified type of sensor from a piece of equipment, such as a dumbbell 212, is brought within a radius, such as less than one meter, of the computing device, the piece of equipment may be wirelessly scanned and logged in 204. When the accelerometer of each unified type of sensor in the system is triggered, it may broadcast the accelerometer data 206. The accelerometer data may be read by the computing device within a radius, such as less than ten meters 206. If a user wishes to use a different piece of exercise equipment, motion-triggered unified type of sensor from the new piece of equipment, such as a dumbbell 216, is brought within a radius, such as less than one meter, of the computing device, the piece of equipment may be wirelessly scanned and logged in 208. In an alternative a piece of equipment may be logged in through scanning a QR code, Bluetooth, NFC tag, or other means. For example, an alternative ways to login may include scanning a QR code on the equipment with a camera on a mobile device, reading an NFC tag again with the phone, or using bluetooth pairing where to confirm the connection a user will need to press a button on the sensor.

Figure 3:
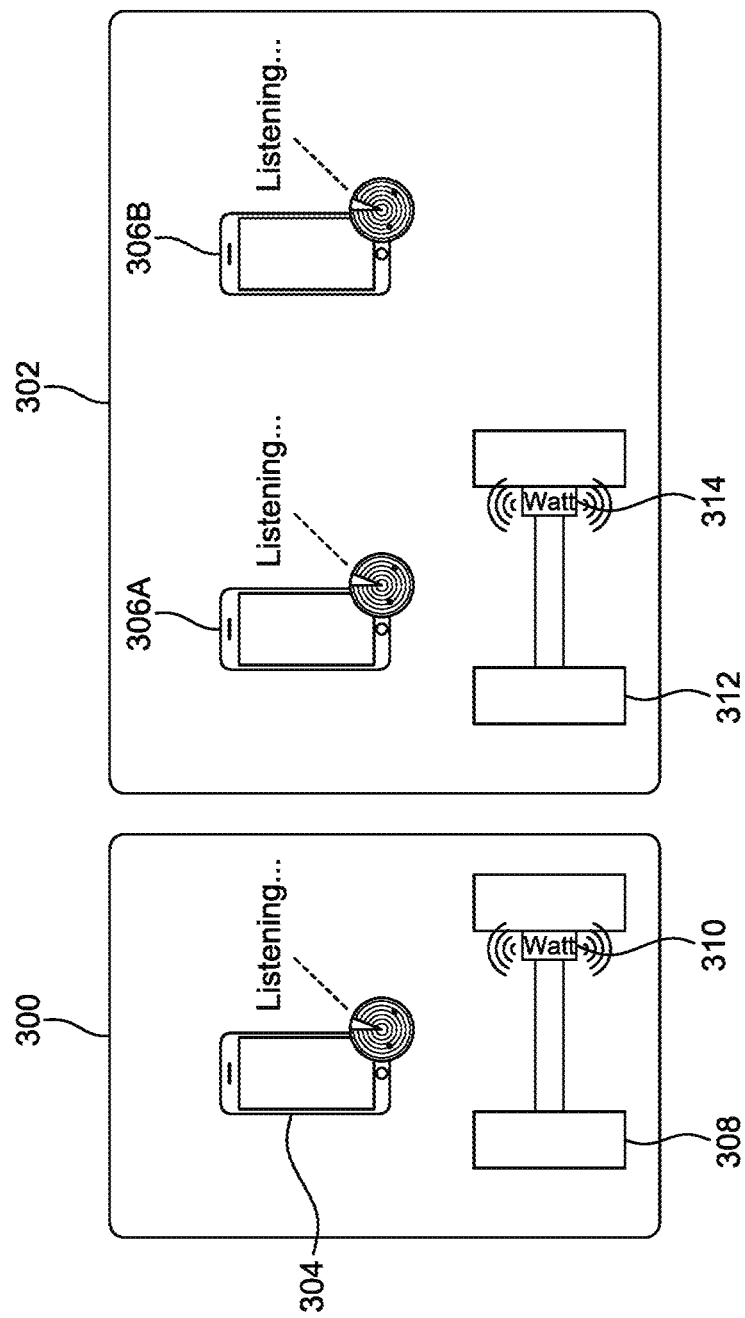
FIG. 3 is an example embodiment of the system utilizing multiple devices applied to one barbell or dumbbell.

The example embodiment displayed in FIG. 3 shows how the system may be configured so that multiple people, such as a coach or trainer, can monitor the equipment at the same time. In one circumstance 300, a user may utilize a computing device 304 and a chosen piece of exercise equipment, such as a dumbbell 308, to log-in with a particular wireless sensor 310. In the example embodiment comprising two users and computing devices 306A 306B, both users may view the wireless sensor 314 data from a single piece of equipment, such as a dumbbell 312.

Figure 4:
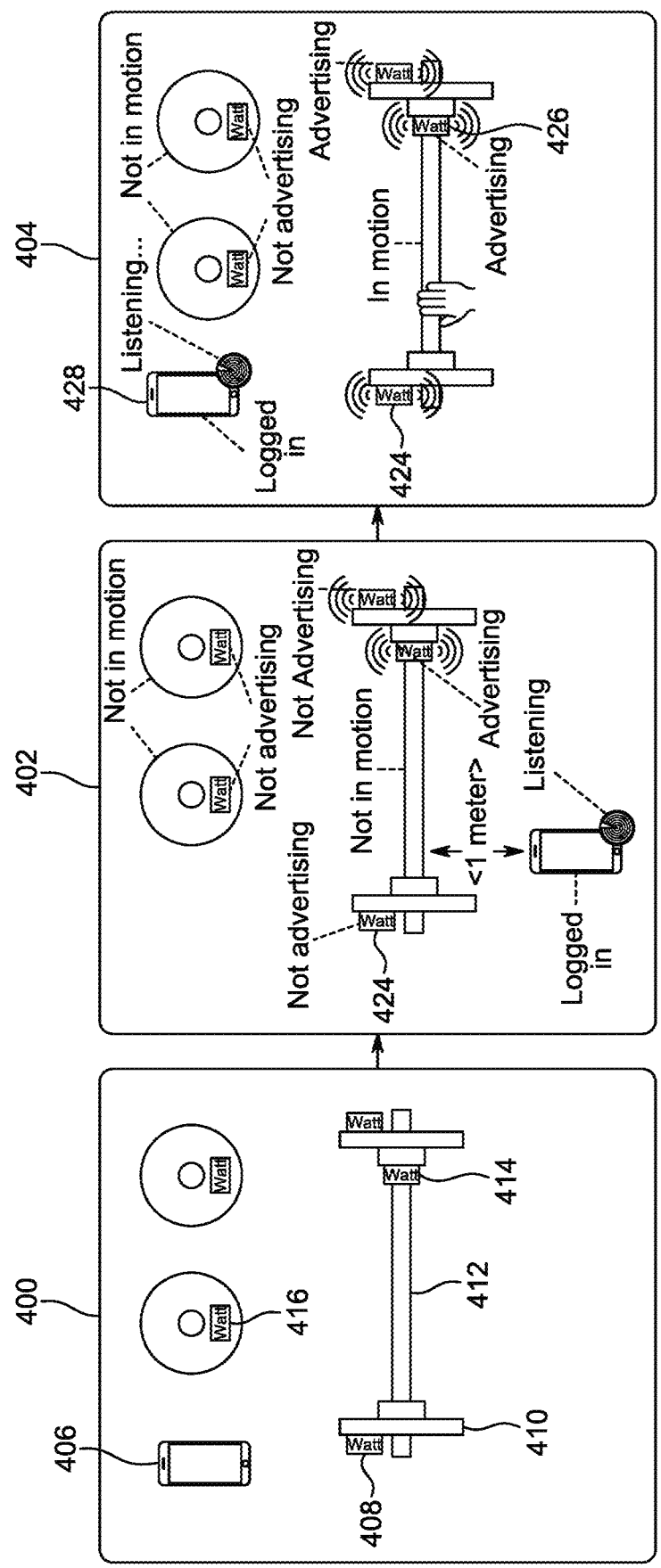
FIG. 4 is an example embodiment of the setup process applied to a Olympic bar with weight plates.

FIG. 4 is an example embodiment of the log-in sensing process applied to an Olympic bar with weight plates. Initially, the Olympic bar 412 is not in use 400. The user device 406 is not logged in and the unified type of sensor 414 408 416 is not broadcasting. When a motion-triggered unified type of sensor from a piece of equipment such, as an Olympic bar 412, is brought within a radius, such as less than one meter, of the computing device 420, the piece of equipment may be wirelessly scanned and logged in 402. When the accelerometer of each unified type of sensor 424 426 in the system is triggered, it may broadcast the accelerometer data. The accelerometer data may be read by the computing device 428 within a radius, such as less than ten meters. In this example embodiment, one sensor 426 was used for initial log-in sensing, and the accelerometer data from all sensors in motion is analyzed 404. Machine learning may be used to determine which sensors together constitute a rigid body, as shown in this embodiment by the recognition of additional sensors 424 during exercise 404.

Figure 5:
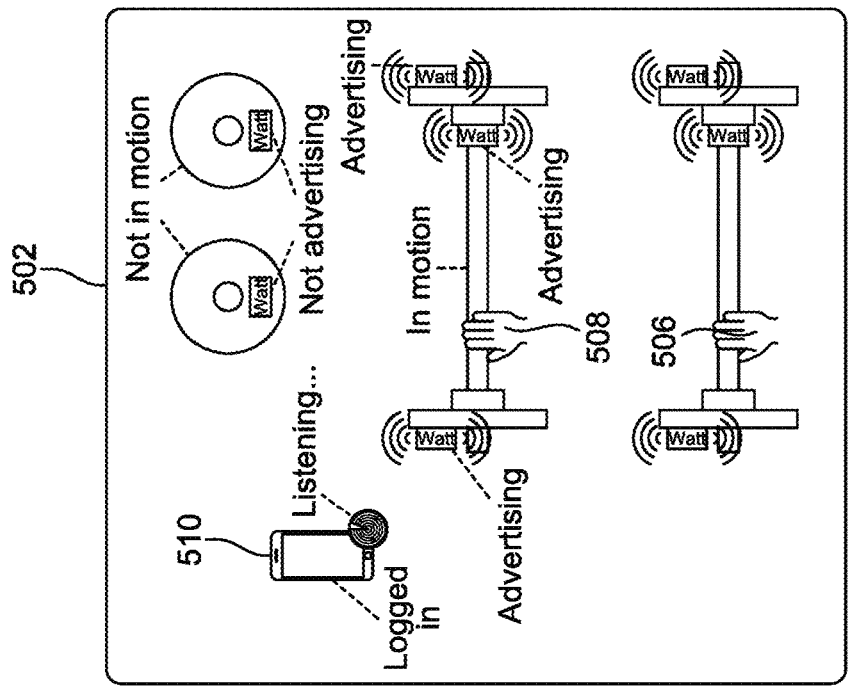
FIG. 5 is an example embodiment of the system utilizing one device and multiple Olympic bars with weight plates.
Figure 5:
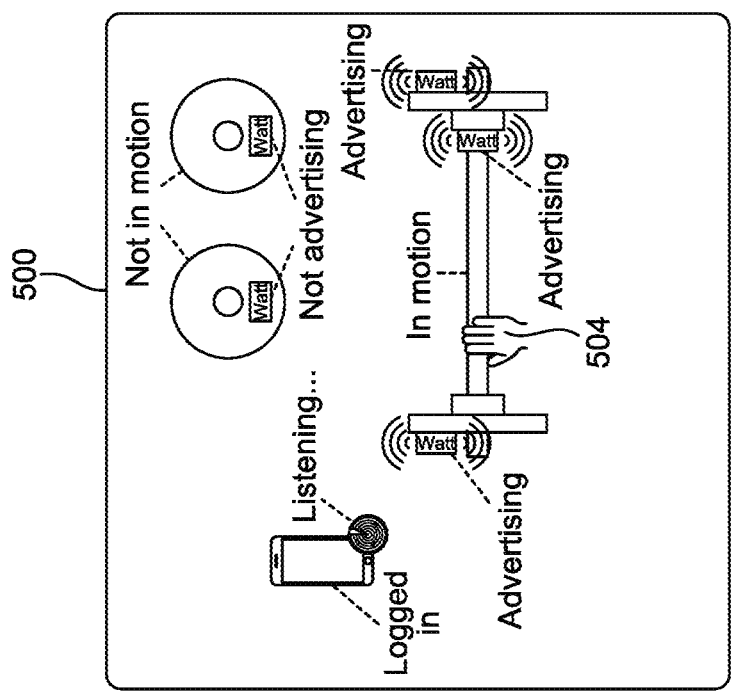

FIG. 5 is an example embodiment of the system utilizing one device and multiple Olympic bars with weight plates. In this example embodiment, the system may be configured so that multiple pieces of fitness equipment may be used at the same time. For this embodiment, one user 504 may utilize the Olympic bar associated with a computing device 500, or multiple users 506 508 may each utilize a separate piece of exercise equipment associated with one or more computing devices 510.

Figure 6:
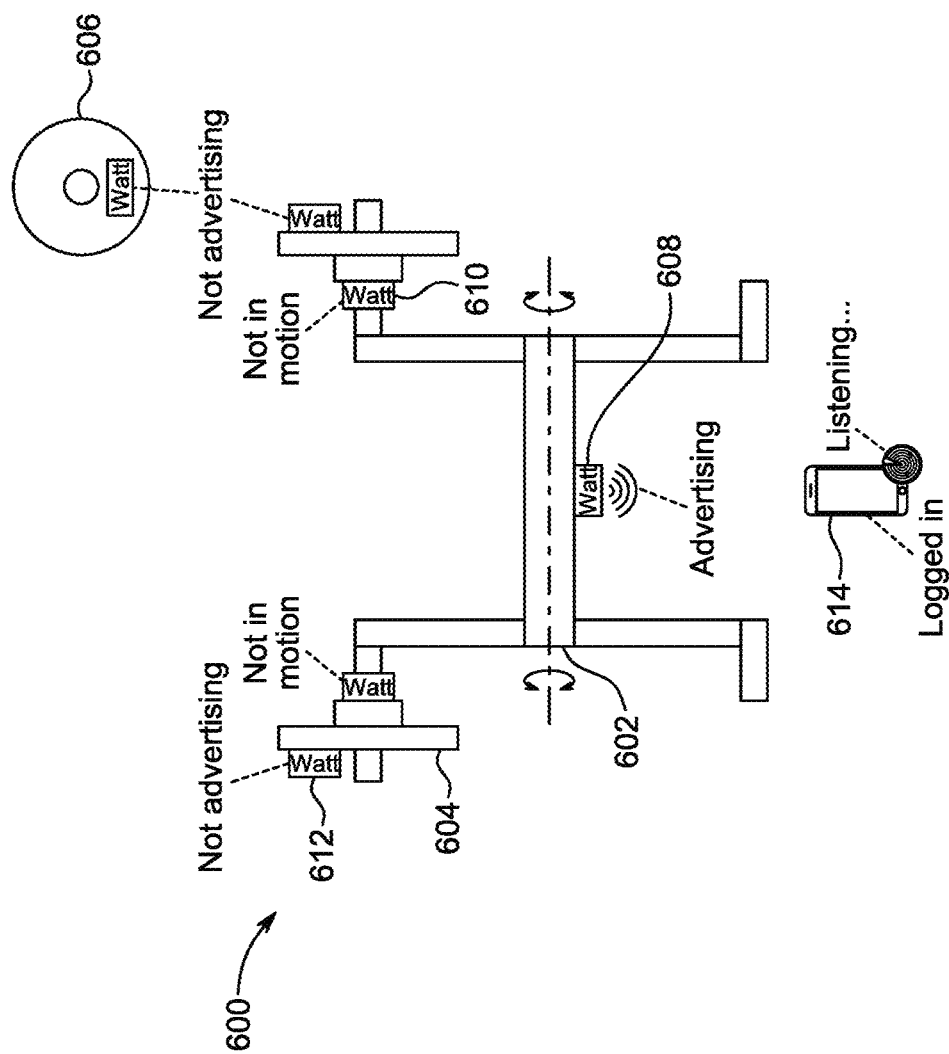
FIG. 6 is an example embodiment of the system as applied with plate loaded fitness machines.

FIG. 6 is an example embodiment of the system as applied with plate loaded fitness machines 600. When a motion-triggered unified type of sensor 608 associated with a piece of equipment such, as a plate loaded fitness machine 602, is brought within a radius, such as less than one meter, of the computing device 614, the piece of equipment may be wirelessly scanned and logged in. When the accelerometer of each unified type of sensor 608 610 612 in the system is triggered, it may broadcast the accelerometer data. The accelerometer data may be read by the computing device 614 within a radius, such as less than ten meters.

Figure 7:
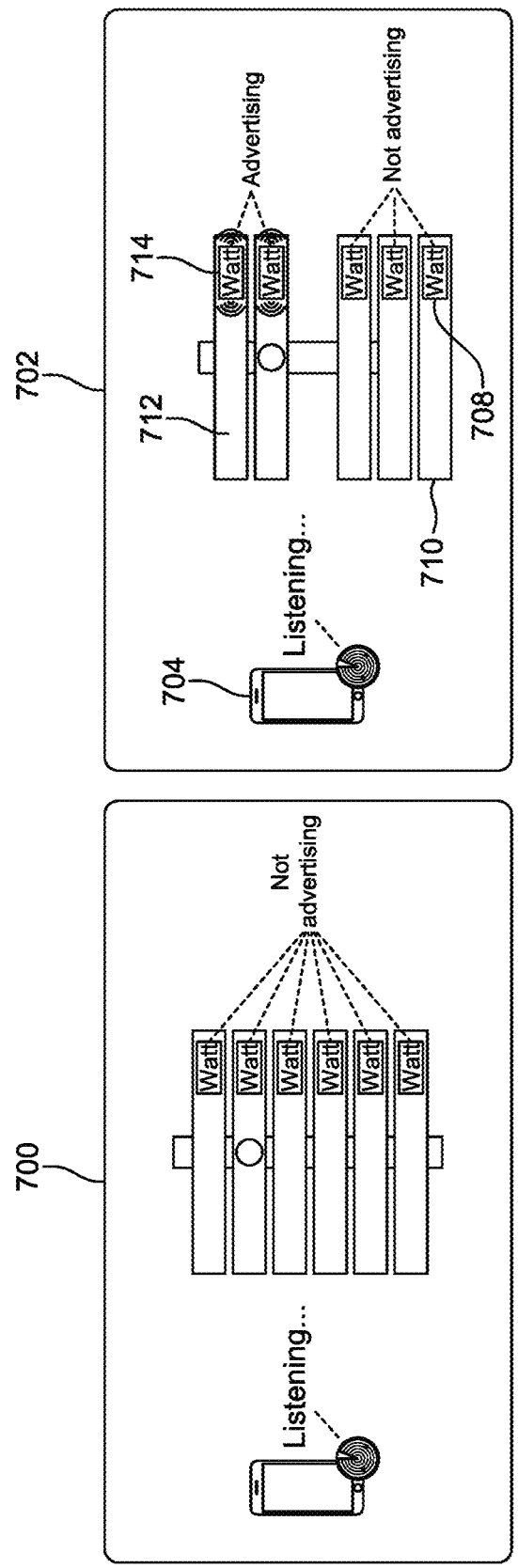
FIG. 7 is an example embodiment of the system as applied with selectorized fitness machines.

FIG. 7 is an example embodiment of the system as applied with selectorized fitness machines. The unified type of sensor for log-in purposes for selectorized and plate-loaded machines may be configured to be continuously broadcasting their unique IDs, which may be wirelessly scanned and logged in when brought within a radius, such as less than one meter, of a computing device 704. When the accelerometer of a sensor configured to a selectorized machine 714 in the system is triggered, it may broadcast the accelerometer data. The accelerometer data may be read by a computing device 704 within a radius, such as less than ten meters. In this example embodiment of a selectorized fitness machine, the wireless sensors 708 attached to stationary weights 710 are not advertising, and the wireless sensors 714 attached to weights in use 710 are advertising data to a computing device 704. Similar to an embodiment utilizing an Olympic bar and plate weights, the system may be configured so that the total weight a user lifts is calculated. The computing device may monitor and record the accelerations of many beacons simultaneously. Machine learning may be used to determine which sensors together constitute a rigid body, and based on which sensors constitute a rigid body, the weight can be calculated by referencing the data from the database.

Figure 8:
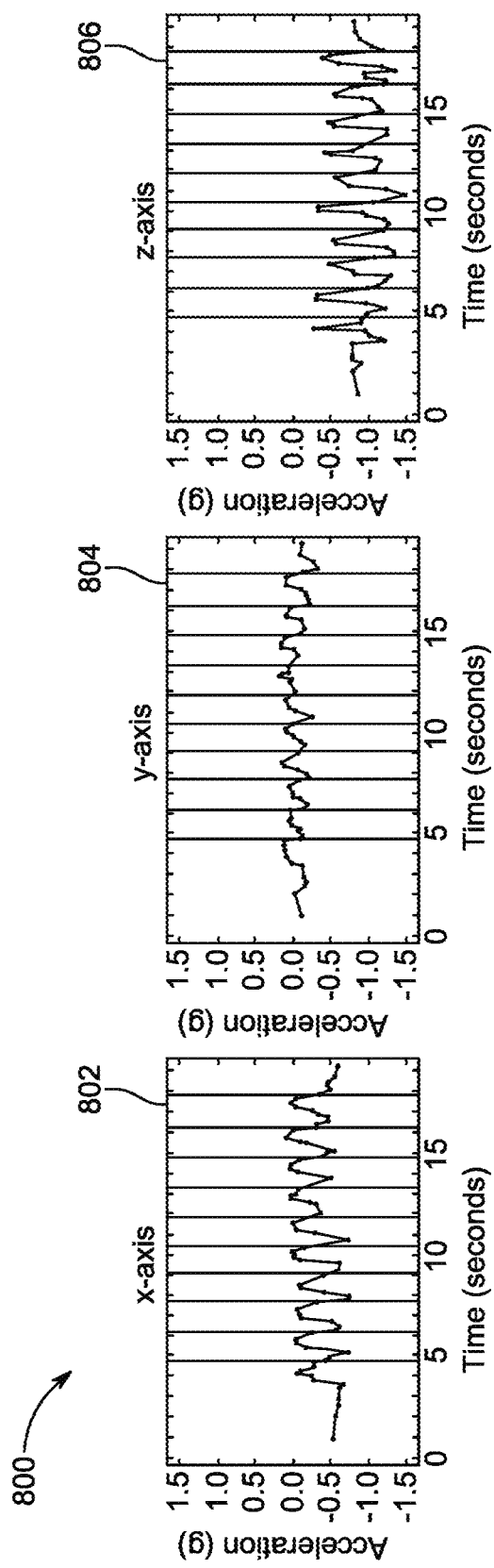
FIG. 8 is an example of raw accelerometer data and marked repetition times for dumbbell exercise of deadlifts.

FIG. 8 provides example graphs 802, 804, 806 of raw accelerometer data and marked repetition times for dumbbell exercise of deadlifts.

Figure 9:
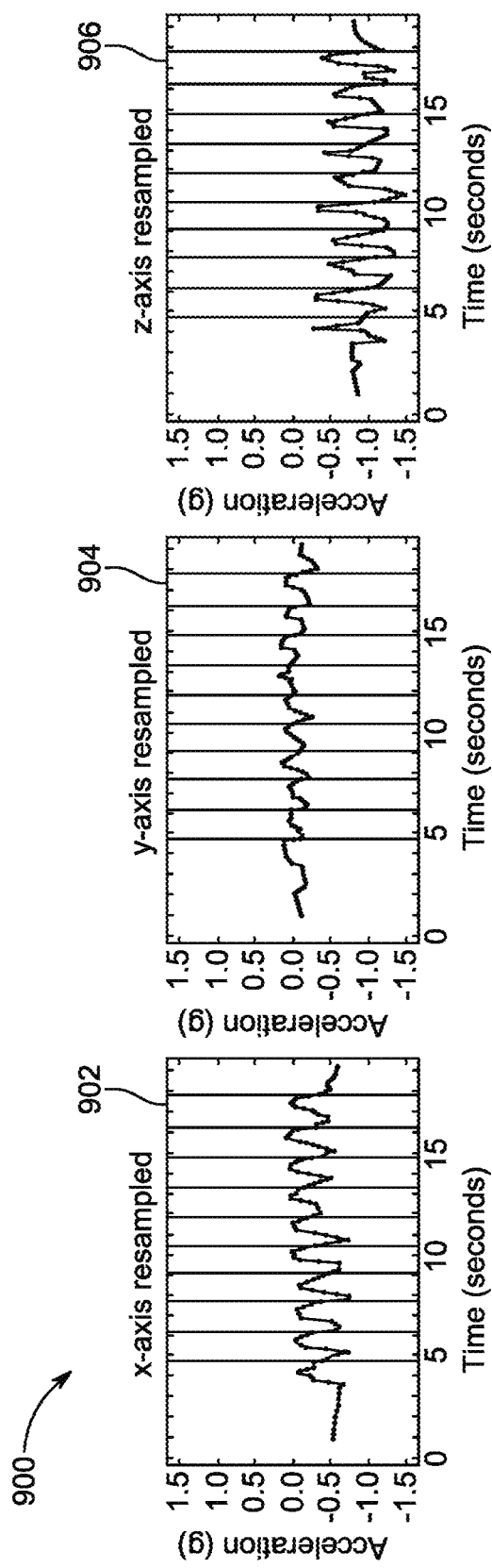
FIG. 9 is an example of resampled accelerometer data to $\Delta t=0.1$ seconds.

FIG. 9 provides example graphs 902, 904, 906 of resampled accelerometer data to $\Delta t=0.1$ seconds. The data may be resampled for both training and testing. With resampling rate $\Delta t$ and linear interpolation, a data matrix X of size $n_T \times 3$ where $n_T=1+T/\Delta t$ may be obtained FIG. 10 provides example graphs 1002, 1004, 1006 a single window of training data.

Figure 10:
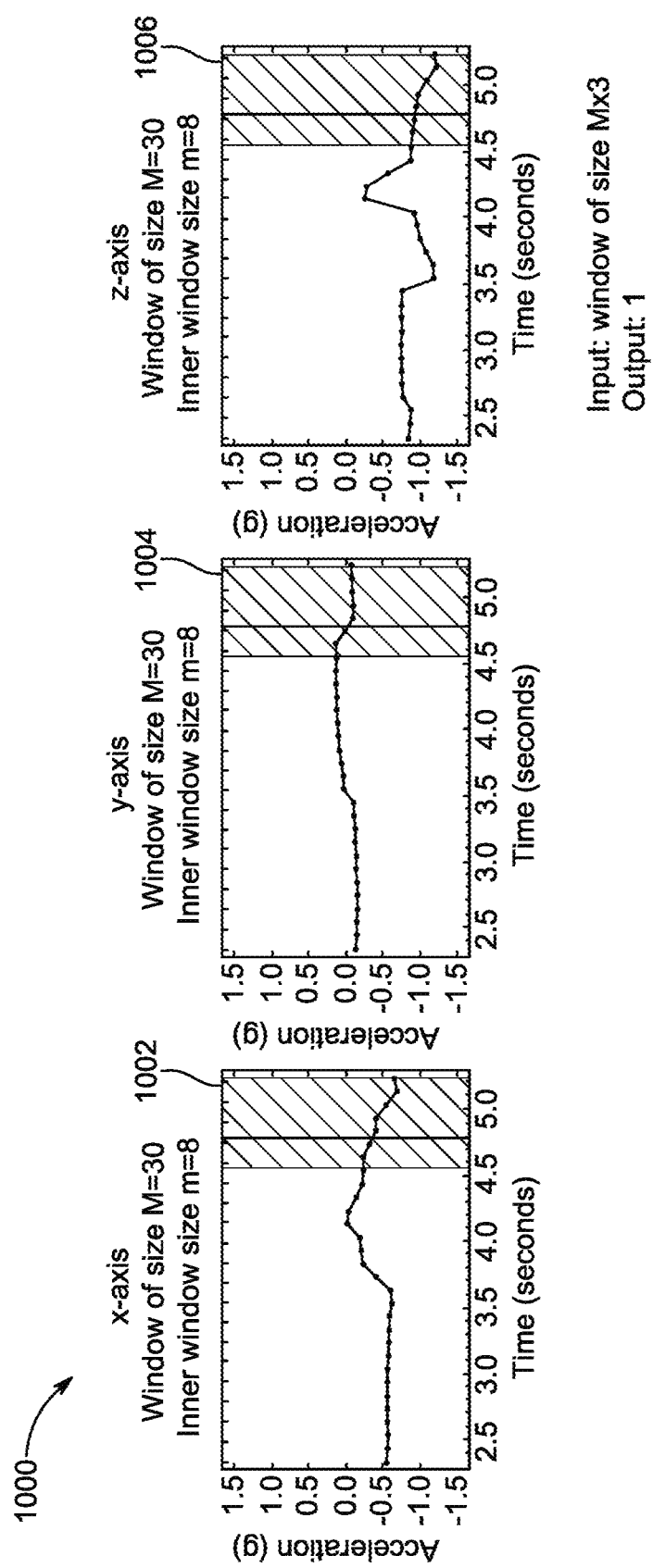
FIG. 10 is an example of a single window of training data.
Figure 11:
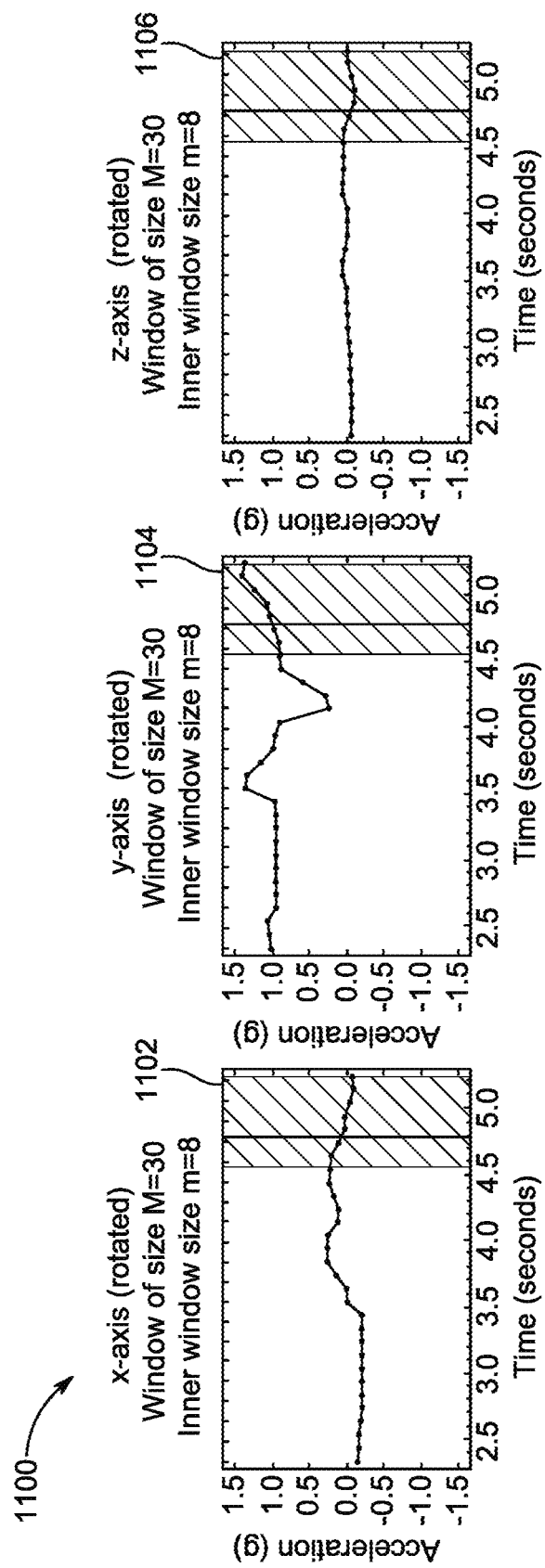
FIG. 11 shows an example rotated window of training data.

FIG. 11 provides example graphs 1102, 1104, 1106 data from FIG. 10 rotated to a new basis.

Figure 12:
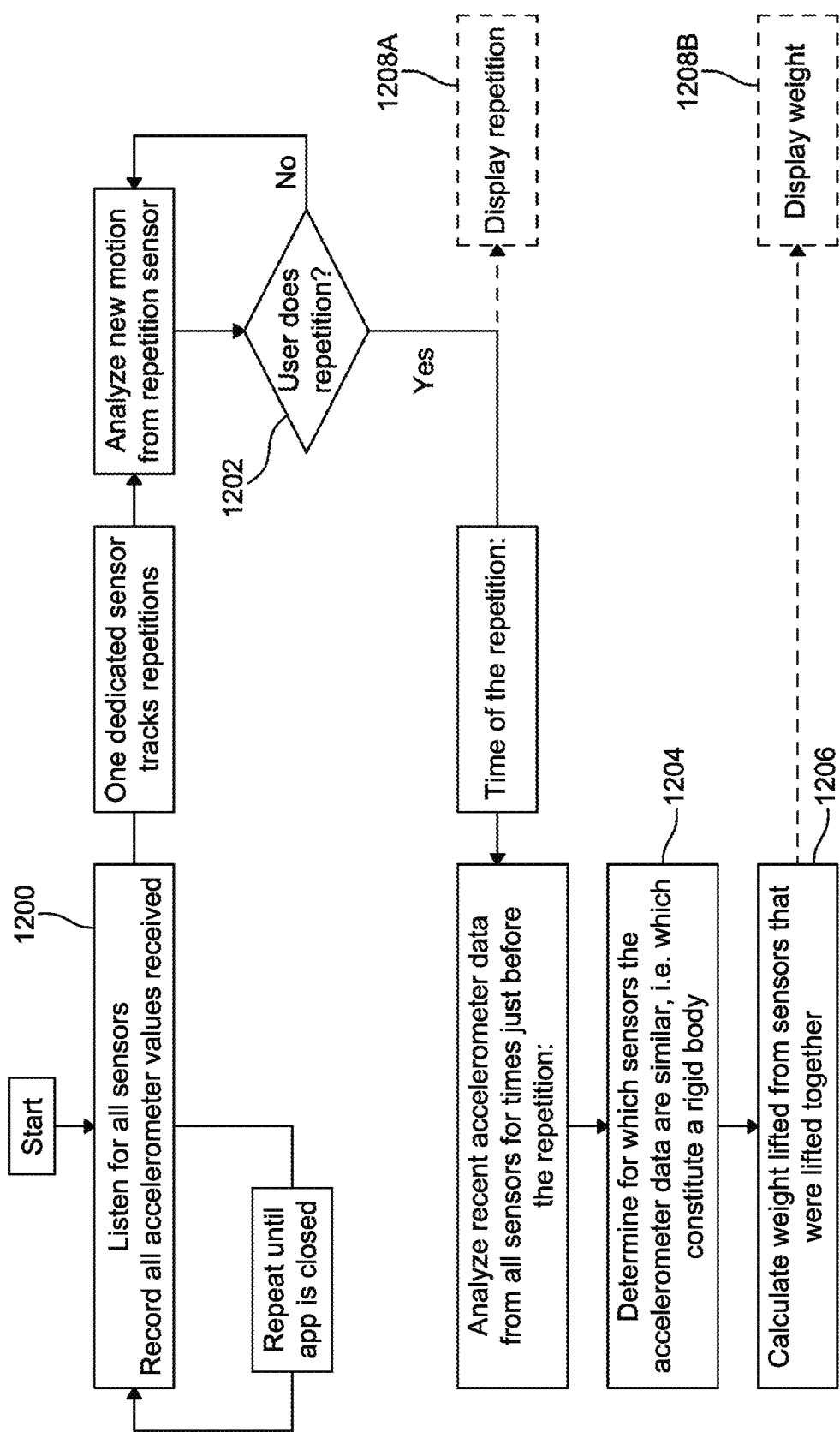
FIG. 12 is a flowchart showing how weight is calculated and display in an embodiment of the system.

FIG. 12 is a flowchart showing an example of how weight may be calculated and displayed in an embodiment of the system. The system initially listens for sensors and records received accelerometer data 1200. Following the reception and analysis of the sensor data, the data will be analyzed to determine repetitions 1202.

The process may be used to determine repetitions in a supervised setting. The input data may include accelerometer recordings x(t) of size 3: (x,y,z dimension for $t \in [0, T]$). Additionally, a set of labels may be provided from manually marking the repetitions $\{t_1^{(r)}, t_2^{(r)}, \ldots, t_{n_r}^{r}\}$ as shown. First, the data may be resampled for both training and testing. With resampling rate $\Delta t$ and linear interpolation, a data matrix X of size $n_T \times 3$ where $n_T=1+T/\Delta t$ may be obtained. To encode repetitions, a sliding window size M>0 may be chosen, which is the number of timepoints in X to use for prediction. Furthermore, an inner window size $0<m \leq m_{max}$ may be chosen. $m_{max}$ may be calculated by computing all the inter-repetition times $\Delta t_i^{(r)} = t_{i+1}^{(r)} - t_i^{(r)}$ for $I=1, \ldots, n_r-1$, computing the minimum inter-repetition time min $(\{\Delta t^{(r)}\})$ where the maximum inner window size is $m_{max} = \min(\{\Delta t^{(r)}\})/\Delta t - 1$. To generate the training data pairs from X and the repetition counts to, the window of size M can be adjusted along in time $W_M=\{i, \ldots, i+M-1\}$ to obtain submatrix $X_{i:i+M-1}$. For each window, an input and output pair may be generated. The input may be generated by flatten($X_{i:i+M-1}$). The output may be generated by setting the window size of M to the timepoints $W_M=\{i, \ldots i+M-1\}$, setting the inner window of size m to the timepoints $W_m=\{I+M-m, \ldots, i+M-1\}$, and checking which of the repetitions $t_i^{(r)}$, if any, fall into the window $T_m$, where the output is one if a repetition falls into $T_m$, and the output is 0 if a repetition does not fall into $T_m$. This constitutes the training data $\mathbb{R}^{M \times 3} \to \mathbb{R}^1$. There may be rotational invariance in the system as well. For every window of data $X_{i:i+M-1}$, a mean acceleration vector $\bar{x}$ can be computed. Next, the rotation matrix R for rotating $\bar{x}$ into some chosen unite vector e may be computed. Finally the rotation matrix may be computed and applied to every data vector $(RX_{i:i+M-1}^T)^T$. The rotated window of training data is shown in FIG. 11. After training, the number of repetitions may be computed in real-time from a new set of data Y. After a repetition has been recognized, the repetition is tracked and displayed to a user 1208A, such as via a display on a computational device.

Additionally, the system may be configured so that the weight a user lifts is calculated. The accelerometer data from all sensors is analyzed in a short time window before the repetition occurred. Machine learning may be used to determine which sensors together constitute a rigid body 1204. Based on which sensors constitute a rigid body, the weight can be calculated by referencing the data from the database 1206. The calculated weight information can then be displayed to a user 1208B, such as via a display on a computational device. In an embodiment of the system, the type of exercise may be determined based on the accelerometer data and referencing the equipment used through the database. In another embodiment of the system, the total weight lifted, the number of repetitions, and type of exercise may be displayed on a display connected to the computing device, physically or wirelessly. Additionally, the system may be configured so that multiple people, such as a coach or trainer can monitor the equipment at the same time, as shown in FIG. 3. In another embodiment of the system, additional data may be tracked and displayed to include parameters such as calories burned, force exerted, power exerted (this includes average and peak values for power and force), timing of repetitions, suggested wait times between exercises, score of overall performance, suggested next exercise, muscle groups and equipment usage.

Figure 13:
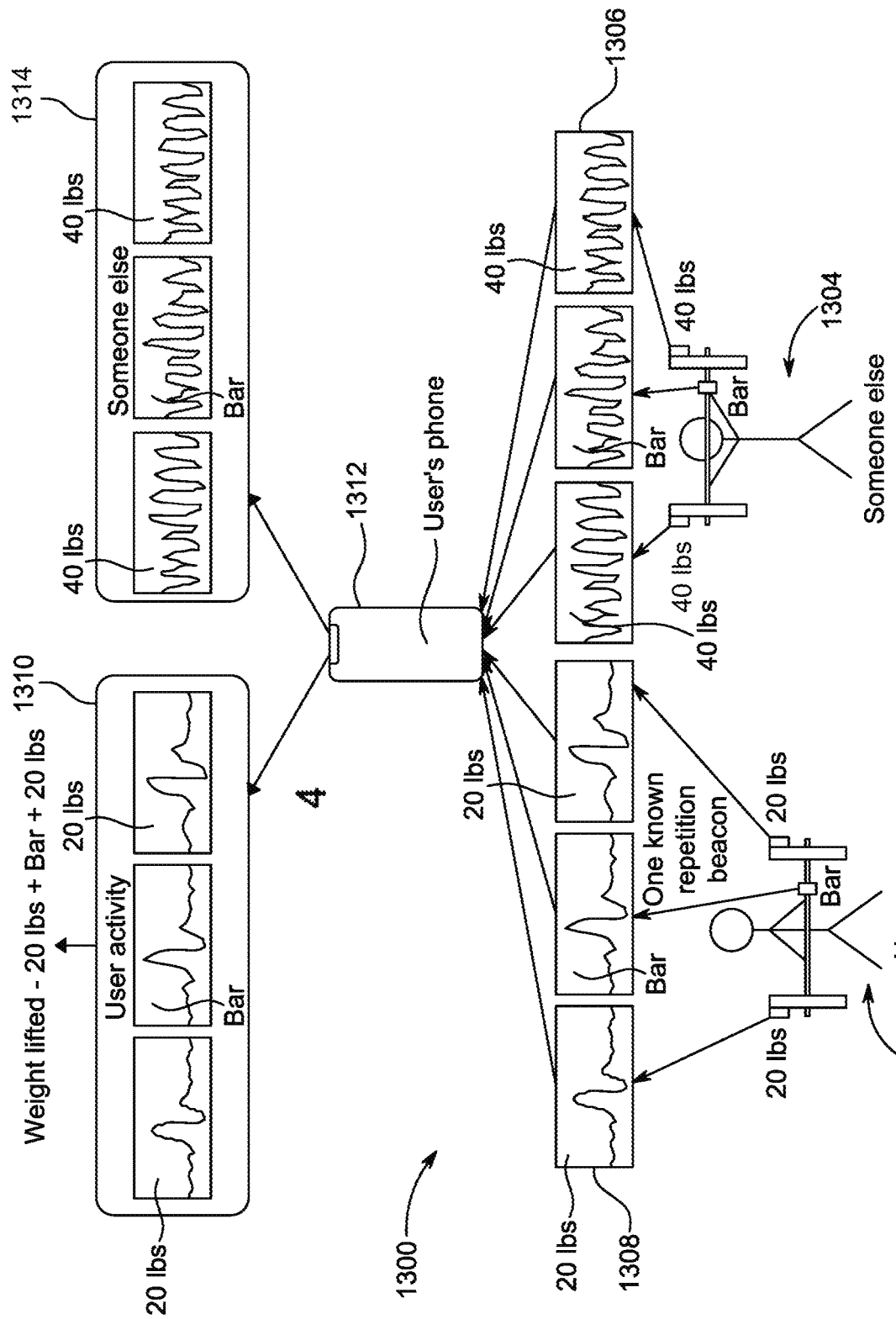
FIG. 13 is a pictorial representation of how weight is calculated in an embodiment of the system.

FIG. 13 is a pictorial representation of how weight is determined in an embodiment of the system 1300. The computing device 1312 may monitor and record the accelerations 1306 1308 of many beacons and users 1302 1304 simultaneously. In such an embodiment, the fitness weight equipment being used may be any variety of weight equipment within the system, such as dumbbells, barbells, Olympic bars, plate weights, or plate loaded fitness machines. After a piece of equipment is logged in, either wirelessly, through scanning a QR code, Bluetooth, an NFC tag, or other means, the accelerations of that equipment is known and analyzed to see if a repetition occurred through the broadcast data of its unified type sensor 1310 1314. Once a repetition is recognized, the weight is calculated. The accelerometer data from all sensors is analyzed in a short time window before the repetition occurred. Machine learning may be used to determine which sensors together constitute a rigid body. Based on which sensors constitute a rigid body, the weight can be calculated by referencing the data from the database and may be displayed on a computational device 1312. Additionally, such an embodiment may recognize which sensors are in use by which user.

When an exercise is complete a user can press log-out/next button in the app, or if it's a guided workout user is automatically logged out from the equipment upon completion, or if no motion is detected for more than a minute the user is also automatically logged out.

Hardware-wise all the sensors may be the same. The sensors may be programmed differently. A login sensor on selectorized and plate-loaded machine may not be setup to but may turn on from motion triggering. In some examples, the login sensor may not use any motion sensors and may use Bluetooth proximity and is constantly on.

To share the data with another person such as a coach or friend in real-time the coach/friend may use a different app (coach/friend app) where the phone may listen to the sensors in a same way as main unit but may not record the information to the cloud. In this app the "in-use" time stamp for the equipment is ignored, and coach's/friend's phone may collect and analyse data from the equipment in use. Alternatively user's computation device, for example a phone, may wirelessly rebroadcast it to a known (friendly) user (e.g. coach). The coach/friend user may be specified in the database.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a type of strength training exercise from accelerometer data, the method comprising:
    attaching a plurality of wireless sensors onto or into a plurality of pieces of strength training equipment, wherein each individual wireless sensor from the plurality of wireless sensors is attached to and associated with an individual piece of strength training equipment of the plurality of pieces of strength training equipment, wherein each wireless sensor comprises a three-axis accelerometer and a wireless transmitter;
    directly registering, via Bluetooth, each wireless sensor of the plurality of wireless sensors attached to each individual piece of strength training equipment with a single phone or smartwatch device, including logging a weight of each individual piece of the strength training equipment;
    directly collecting, by the associated individual wireless sensor of the plurality of wireless sensors, the accelerometer data during a performance of a strength training exercise using a subset of the plurality of pieces of strength training equipment;
    wirelessly transmitting the accelerometer data to the single phone or smartwatch device;
    generating exercise data, by a machine learning process of the single phone or smartwatch device, from the accelerometer data,
    wherein the exercise data comprises the type of the strength training exercise, a weight associated with the subset of the plurality of pieces of the strength training equipment, a total weight, and a number of repetitions of the strength training exercise; and
    displaying at least the type of the strength training exercise of the exercise data via a display physically connected or wirelessly connected to the single phone or smartwatch device,
    wherein the single phone or smartwatch device is further configured to process the accelerometer data to determine which wireless sensors constitute a rigid body, and
    wherein the machine learning process of the single phone or smartwatch device comprises at least a rotation matrix software algorithm that utilize training data to generate the exercise data.

2. The method of claim 1, further comprising recording the exercise data in the database.

3. The method of claim 1, wherein the accelerometer data is processed to determine which wireless sensors constitute the rigid body.

4. The method claim 1, wherein the machine learning process of the single phone or smartwatch device comprises process the accelerometer data with equipment data stored in a database to generate the type of the strength training exercise of the exercise data.

5. The method claim 1, wherein each of the plurality of wireless sensors comprise a Bluetooth emitter.

6. The method claim 1, wherein a login sensor of the plurality of wireless sensors is programmed to utilize Bluetooth proximity to automatically login the single phone or smartwatch device.

7. A method for determining exercise data from accelerometer data, the method comprising:
    measuring accelerometer data through a plurality of wireless sensors that each include an respective three-axis accelerometer, wherein each individual sensor from the plurality of wireless sensors is attached to and associated with an individual piece of strength training equipment of a plurality of pieces of strength training equipment;
    directly, via Bluetooth communication, transmitting the accelerometer data to a single phone or smartwatch device;
    generating the exercise data, by a machine learning process of the single phone or smartwatch device, from the accelerometer data, wherein the exercise data comprises a type of strength training exercise from a plurality of types of strength training exercises;

determining the individual pieces of the plurality of pieces of strength training equipment used in the strength training exercise; and displaying the exercise data to a user via a display physically connected or wirelessly connected to the single phone or smartwatch device, wherein the single phone or smartwatch device is further configured to process the accelerometer data to determine which wireless sensors constitute a rigid body, and wherein the machine learning process of the single phone or smartwatch device comprises at least a rotation matrix software algorithm that utilize training data to generate the exercise data.

8. The method of claim 7, wherein the exercise data includes a total weight used and a number of exercise repetitions.

9. The method of claim 7, further comprising:

logging details of the strength training equipment comprising equipment type and weight in a database; and recording the exercise data in the database.

10. A system for determining exercise data from accelerometer data, the system comprising:

a plurality of sensors configured to communicate wirelessly and generate the accelerometer data, wherein each sensor of the plurality sensors includes a three-axis accelerometer and is configured to a unique piece of strength training equipment;

a database comprising data associating each unique piece of the strength training equipment with a respective sensor of the plurality of sensors;

a single phone or smartwatch device configured to:
  directly communicate, via Bluetooth, with the plurality of sensors and the database,
  directly register at least one of the plurality of sensors used in performing an exercise,
  determine, by machine learning process of the single phone or smartwatch device, the exercise data from the accelerometer data generated by the at least one of the plurality of sensors and the unique piece of the strength training equipment associated with the at least one of the plurality of sensors, wherein the exercise data comprises a type of the exercise, and
  cause a display of the type of the exercise, wherein the single phone or smartwatch device is further configured to process the accelerometer data to determine which wireless sensors constitute a rigid body, and wherein the machine learning process of the single phone or smartwatch device comprises at least a rotation matrix software algorithm that utilize training data to generate the exercise data.

11. The system of claim 10, wherein the exercise data comprises a set that comprises the total amount of weight, a number of repetitions, and a number of calories burned.

\* \* \* \* \*